(12) United States Patent
Ravindranath et al.

(10) Patent No.: US 12,073,415 B2
(45) Date of Patent: Aug. 27, 2024

(54) IDENTIFICATION OF UNSUPPORTED DEVICE CAPABILITY TO SERVICE PROVIDER FOR ENHANCEMENT AND CUSTOMER ATTRACTION

(71) Applicant: ARRIS Enterprises LLC, Suwanee, GA (US)

(72) Inventors: Nithin Raj Kuyyar Ravindranath, Karnataka State (IN); Vinod Jatti, Karnataka (IN); Kiran Tovinkere Srinivasan, Karnataka (IN); Santosh Basavaraj Budni, Karnataka (IN); Sandeep Guddekoppa Suresh, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 303 days.

(21) Appl. No.: 17/480,904

(22) Filed: Sep. 21, 2021

(65) Prior Publication Data
US 2022/0101335 A1    Mar. 31, 2022

Related U.S. Application Data

(60) Provisional application No. 63/084,104, filed on Sep. 28, 2020.

(51) Int. Cl.
*G06Q 10/00*  (2023.01)
*G06Q 30/016*  (2023.01)
*G06Q 30/0201*  (2023.01)
*H04L 43/065*  (2022.01)
*H04L 67/51*  (2022.01)
*H04L 9/40*  (2022.01)

(52) U.S. Cl.
CPC ....... *G06Q 30/016* (2013.01); *G06Q 30/0201* (2013.01); *H04L 43/065* (2013.01); *H04L 67/51* (2022.05); *H04L 63/20* (2013.01)

(58) Field of Classification Search
None
See application file for complete search history.

(56) References Cited

U.S. PATENT DOCUMENTS

| | | | | |
|---|---|---|---|---|
| 7,103,681 | B2 * | 9/2006 | Coulombe | H04L 67/04 717/168 |
| 7,596,620 | B1 * | 9/2009 | Colton | H04L 67/1001 709/224 |
| 11,153,253 | B2 * | 10/2021 | Zhang | H04L 51/214 |

(Continued)

OTHER PUBLICATIONS

R Capilla, J Bosch, P Trinidad, A Ruiz-Cortés, M Hinchey et al. (An overview of Dynamic Software Product Line architectures and techniques: Observations from research and industry) Journal of Systems and . . . , 2014—Elsevier. (Year: 2014).*

(Continued)

*Primary Examiner* — Hafiz A Kassim
(74) *Attorney, Agent, or Firm* — Wenderoth, Lind & Ponack, L.L.P.

(57) ABSTRACT

A client device for identifying unsupported capabilities. A client device detects unsupported capabilities and notifies a service provider or device manufacturer of the unsupported capabilities. The service provider notifies the client device of support for the unsupported capabilities including possible upgrades that may be provided to the client device.

14 Claims, 5 Drawing Sheets

(56) References Cited

U.S. PATENT DOCUMENTS

| | | | | |
|---|---|---|---|---|
| 2004/0085947 | A1* | 5/2004 | Ekberg | H04W 48/16 370/349 |
| 2004/0128554 | A1* | 7/2004 | Maher, III | H04L 61/2589 726/11 |
| 2005/0232284 | A1* | 10/2005 | Karaoguz | H04W 4/18 370/466 |
| 2005/0257226 | A1* | 11/2005 | Belvin | G06F 9/4413 719/318 |
| 2006/0031828 | A1* | 2/2006 | Won | H04L 67/51 717/171 |
| 2006/0217112 | A1* | 9/2006 | Mo | H04W 36/14 455/422.1 |
| 2008/0130639 | A1* | 6/2008 | Costa-Requena | H04L 67/51 370/389 |
| 2011/0083126 | A1* | 4/2011 | Bhakta | G06F 8/65 717/168 |
| 2013/0165081 | A1* | 6/2013 | Wuthnow | H04W 4/12 455/411 |
| 2017/0111813 | A1* | 4/2017 | Townend | H04W 24/04 |
| 2017/0220943 | A1* | 8/2017 | Duncan | G06N 5/04 |
| 2017/0236083 | A1* | 8/2017 | Granero | G06Q 10/06315 705/7.25 |
| 2019/0317754 | A1* | 10/2019 | Mosquera | H04L 51/02 |

OTHER PUBLICATIONS

Scott Nettles (Dynamic Software Updating) 2001 ACM ISBN 1-58113-414-2/01/06. (Year: 2001).*

Pen-Chung Yew (Live Updating Operating Systems Using Virtualization) VEE'Jun. 14-16, 06, 2006 Ottawa, Ontario, Canada). (Year: 2006).*

\* cited by examiner

IDENTIFICATION OF UNSUPPORTED DEVICE CAPABILITY TO SERVICE PROVIDER FOR ENHANCEMENT AND CUSTOMER ATTRACTION

BACKGROUND

The subject matter of the present disclosure relates generally to identifying unsupported capabilities.

SUMMARY

An aspect of the present disclosure involves detecting unsupported capabilities and notifying a service provider or device manufacturer of the unsupported capabilities. The service provider may notify the client device of support for the unsupported capabilities including possible upgrades that may be provided to the client device.

The client device monitors activity of a client device, detects unsupported capability from the monitored activity of the client device, identifies the unsupported capability, stores information associated with the identified unsupported capability, and sends, to a service provider, a notification about the identified unsupported capability.

The client device determines user expectation based on the identified unsupported capability. The client device may notify the service provider about user expectation based on the identified unsupported capability. The unsupported capability includes a type of use case associated with the activity of the client device, interaction data associated with the client device, a device identification, and an identification of unsupported event. Unsupported capabilities may further include an enhanced communication protocol, a new security protocol, a new video format, codec, or resolution, an extension to a browser capability, a new proximity service, a new storage file system format, and a new architecture or accessibility tag.

The client device may further identify factors associated with the identified unsupported capability, determine at least one trend based on the identified factors, and send the service provider information regarding the at least one trend. The client device receives a notification about the identified unsupported capability and information regarding user expectations and information regarding the upgrade. The response message may include an audio message presented by a speaker of client device, an audio message presented to a Bluetooth proximity audio devices, an audio and video message presented on a connected media device, and a short message service (SMS) message to a registered mobile device associated with the client device. The client device presents the response message via a user interface.

BRIEF SUMMARY OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to detecting unsupported capabilities and notifying a service provider or device manufacturer of the unsupported capabilities. The service provider may notify the client device of support for the unsupported capabilities including possible upgrades that may be provided to the client device.

Figure 1:
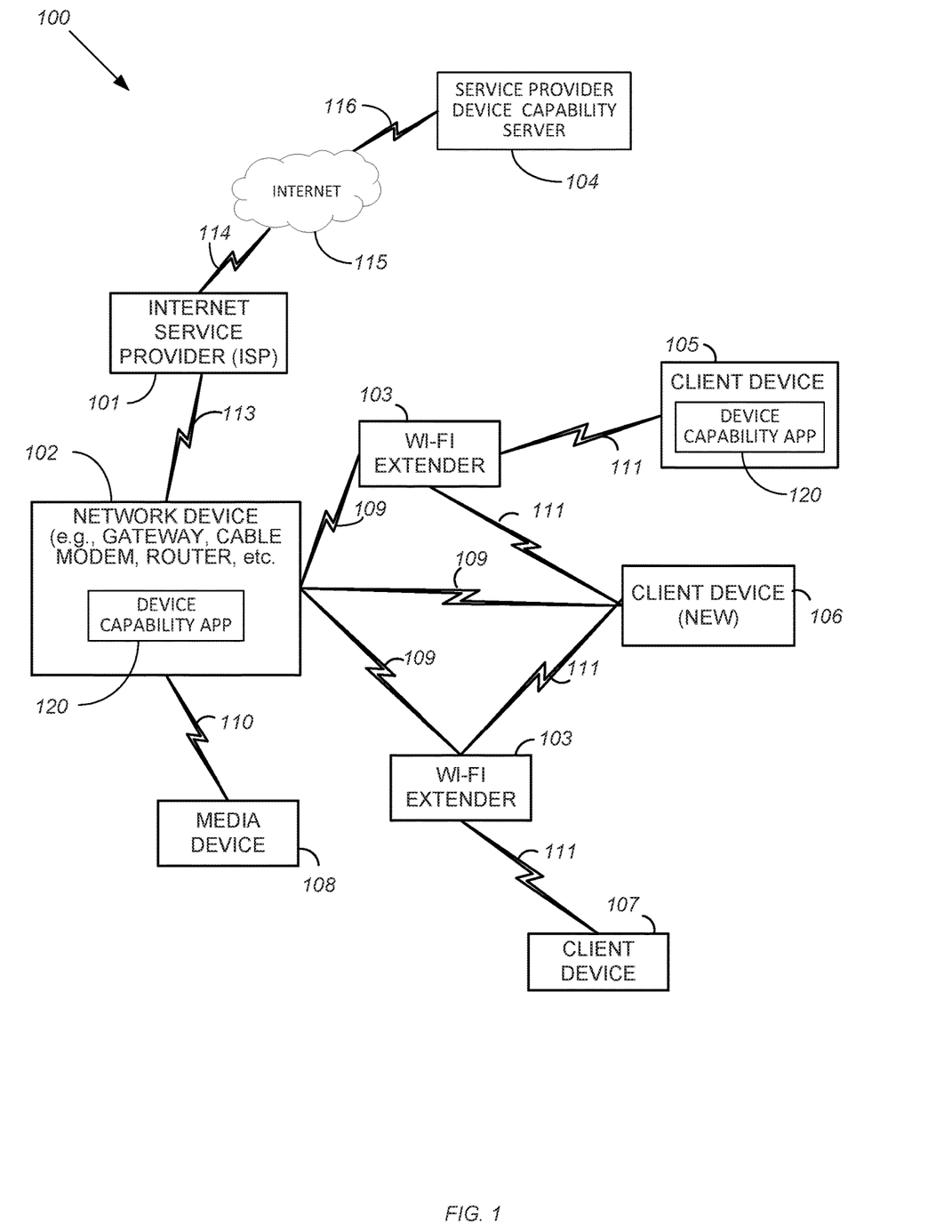
FIG. 1 is a schematic diagram of a system.

FIG. 1 is a schematic diagram of a system 100.

As shown in FIG. 1, the elements of the system include a network device 102 connected to the Internet 115 via an Internet Service Provider (ISP) 101 and also connected to different wireless devices such as wireless extenders 103, wireless client devices 105, 106, 107, and media device 108. The system shown in FIG. 1 includes wireless devices (e.g., wireless extenders 103, wireless client devices 105, 106, 107, and media device 108) that may be connected in one or more wireless networks (e.g., private, guest, iControl, backhaul network, or Internet of things (IoT) network) within the system. Additionally, there could be some overlap between wireless devices (e.g., wireless extenders 103, wireless client devices 105, 106, 107, and media device 108) in the different networks. That is, one or more network devices could be located in more than one network. For example, the wireless extenders 103 could be located both in a private network for providing content and information to wireless client devices 105, 106, 107, and also included in a backhaul network or an iControl network.

Starting from the top of FIG. 1, the ISP 101 can be, for example, a streaming video provider or any computer for connecting the network device 102 to the Internet 115. The connection 114 between the Internet 115 and the ISP 101 and the connection 113 between the ISP 101 and the network device 102 can be implemented using a wide area network (WAN), a virtual private network (VPN), metropolitan area networks (MANs), system area networks (SANs), a DOCSIS (Data Over Cable Service Interface Specification) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 113 can further include as some portion thereof a broadband mobile phone network connection, an optical network connection, or other similar connections. For example, the connection 113 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 113 is capable of providing connections between the network device 102 and a WAN, a LAN, a VPN, MANs, personal area networks (PANs), wireless LANs (WLANs), SANs, a DOCSIS network, a fiber optics network (e.g., FTTH, FTTX, or HFC), a PSDN, a global Telex network, or a 2G, 3G, 4G or 5G network, for example.

The network device 102 can be, for example, a hardware electronic device that may be a combination modem and gateway device that combines the functions of a modem, an access point, and/or a router for providing content received from the content provider 101 to network devices (e.g., wireless extenders 103, wireless client devices 105, 106, 107, and media device 108) in the system. It is also contemplated by the present disclosure that the network device 102 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

Connections 109 between the network device 102, wireless extenders 103, and client device 106 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, 60 GHz, etc. Additionally, the connection 109 can be implemented using a wireless connection that operates in accordance with, but is not limited to, Radio Frequency for Consumer Electronics (RF4CE) protocol, ZigBee protocol, Z-Wave protocol, or IEEE 802.15.4 protocol. It is also contemplated by the present disclosure that the connection 109 can include connections to a media over coax (MoCA) network. One or more of the connections 109 can also be a wired Ethernet connection.

The wireless extenders 103 can be, for example, hardware electronic devices such as access points used to extend the wireless network by receiving the signals transmitted by the network device 102 and rebroadcasting the signals to, for example, wireless client devices 105, 106, 107, which may out of range of the network device 102. The wireless extenders 103 can also receive signals from the wireless client devices 105, 106, 107, and rebroadcast the signals to the network device 102, or other wireless client devices 105, 106, 107.

The connection 111 between the wireless extenders 103 and the wireless client devices 105, 106, 107 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, 60 GHz, etc. Additionally, the connection 111 can be implemented using a wireless connection that operates in accordance with, but is not limited to, RF4CE protocol, ZigBee protocol, Z-Wave protocol, or IEEE 802.15.4 protocol. Also, one or more of the connections 111 can be a wired Ethernet connection.

Wireless client devices 105, 106, 107, and media device 108 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the network device 102. Additionally, the wireless client devices 105, 106, 107, and media device 108 can be a TV, an IP/QAM STB or an SMD that is capable of decoding audio/video content, and playing over over-the-top (OTT) or MSO provided content received through the network device 102.

The connection 110 between the network device 102 and the media device 108 is implemented through a wireless connection that operates in accordance with, but is not limited to, any IEEE 802.11 protocols. Additionally, the connection 110 between the network device 102 and media device 108 may also be implemented through a WAN, a local area network (LAN), a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example. The connection 110 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, 60 GHz, etc. One or more of the connections 110 can also be a wired Ethernet connection.

Figure 2:
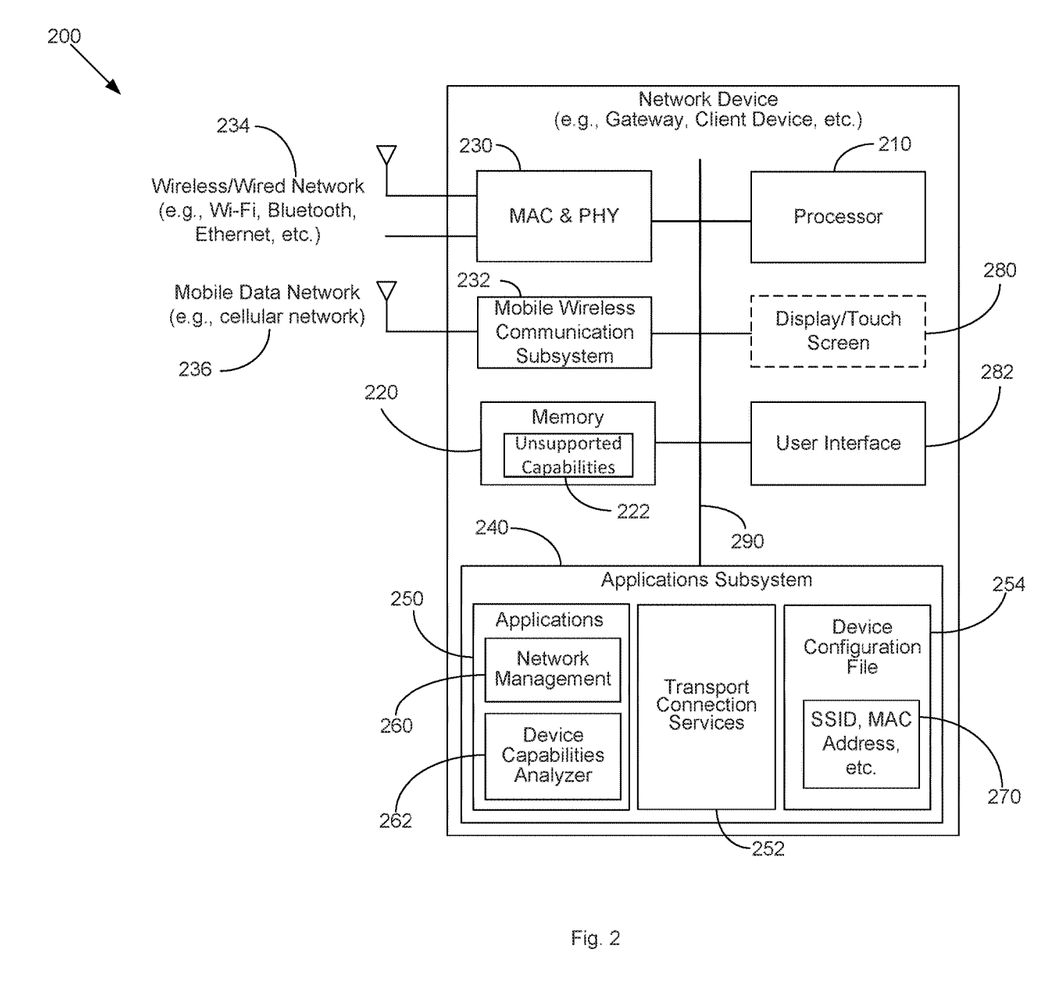
FIG. 2 illustrates a network device.
Figure 3:
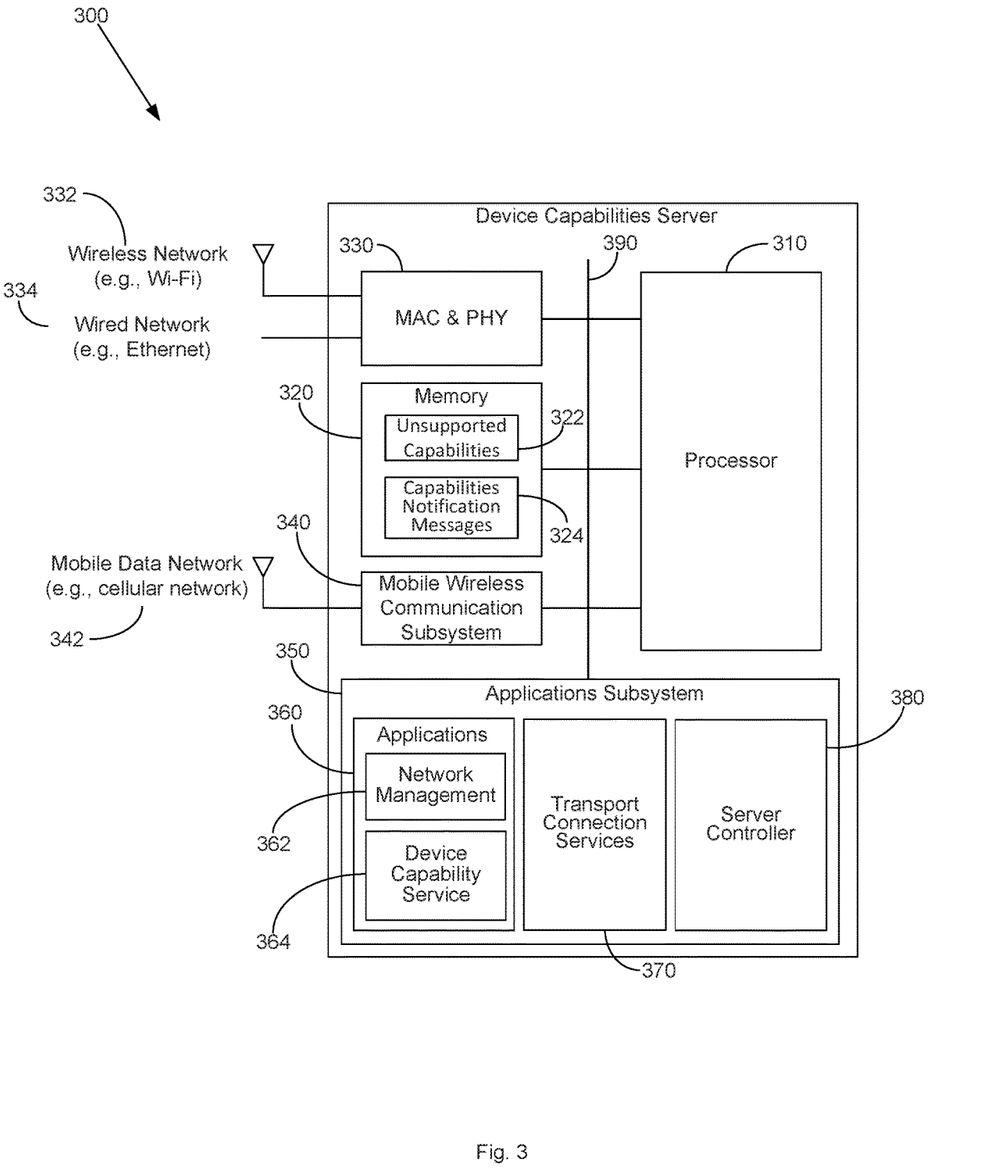
FIG. 3 is a diagram of a device capabilities server.
Figure 4:
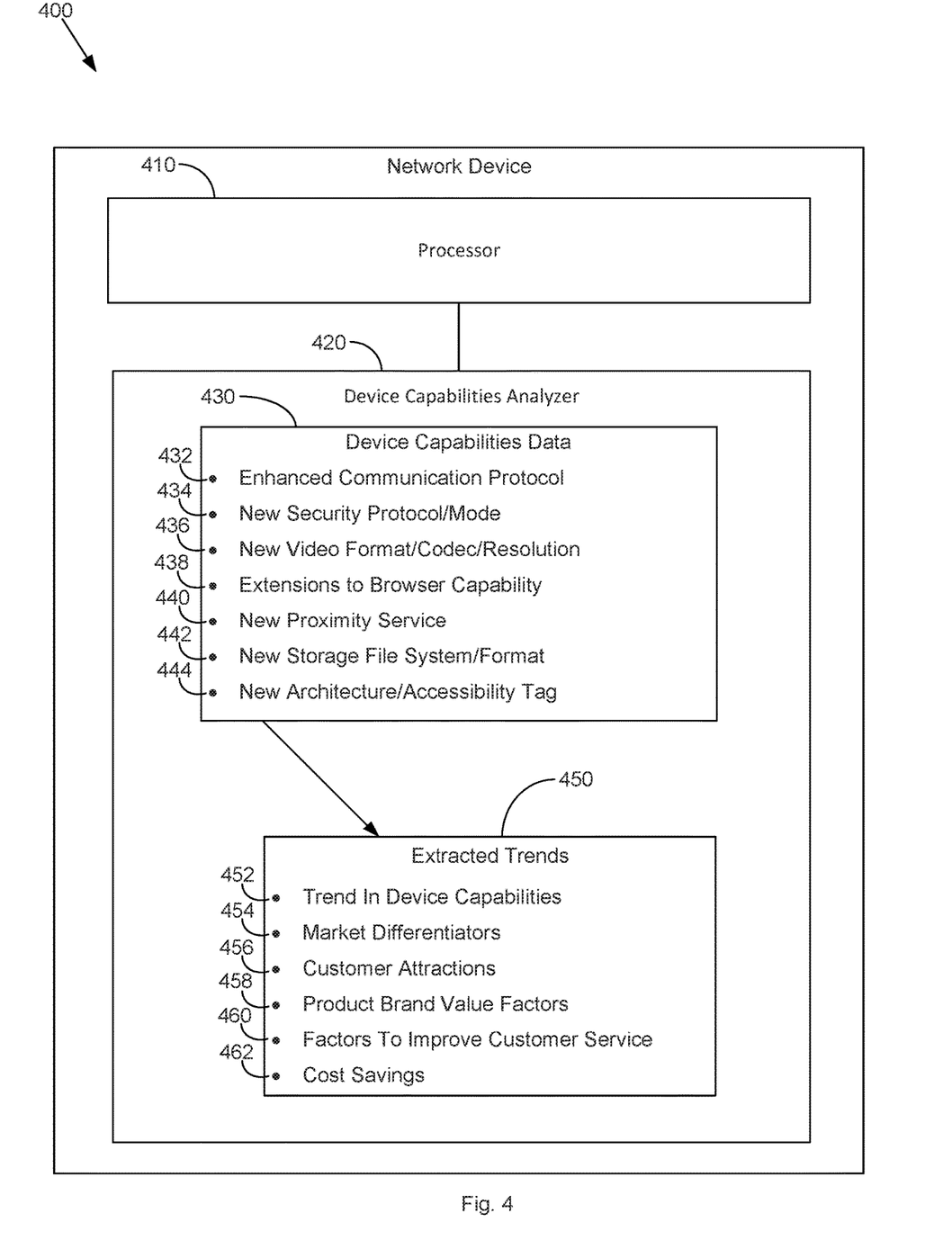
FIG. 4 is a diagram illustrating a network device to extract trends.

A detailed description of the exemplary internal components of the network device 102, the wireless extenders 103, wireless client devices 105, 106, 107, and media device 108 shown in FIG. 1 will be provided in the discussion of FIGS. 2-4. However, in general, it is contemplated by the present disclosure that the network device 102, the wireless extenders 103, and the wireless client devices 105, 106, 107, and media device 108 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the network device 102, the wireless extenders 103, wireless client devices 105, 106, 107, and media device 108 may be adapted to execute any operating system, including Linux, UNIX, Windows, MacOS, DOS, and ChromOS as well as virtual machines adapted to virtualize execution of a particular operating system, including customized and proprietary operating systems. The network device 102, the wireless extenders 103, the wireless client devices 105, 106, 107, and media device 108 are further equipped with components to facilitate communication with other computing devices over the one or more network connections to local and wide area networks, wireless and wired networks, public and private networks, and any other communication network enabling communication in the system.

A service provider device capability server 104 may be connected network device 102 through ISP 101 and Internet 115 through connections 113, 114, 116. Connection 116 can further include as some portion thereof a broadband mobile phone network connection, an optical network connection, or other similar connections. For example, the connection 116 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 116 is capable of providing connections between Service Provider Device Capability Server 104 and a WAN, a LAN, a VPN, MANs, personal area networks (PANs), wireless LANs (WLANs), SANs, a DOCSIS network, a fiber optics network (e.g., FTTH, FTTX, or HFC), a PSDN, a global Telex network, or a 2G, 3G, 4G or 5G network, for example.

A client device, such as client device 105, may include a device capability app 120. Network device 102 may also include a device capability app 120. Thus, client device 105 may monitor activity of the client device 105, detect unsupported capability from the monitored activity, identify the unsupported capability, store information associated with the identified unsupported capability, and send a notification about the identified unsupported capability to the service provider device capability server 104 through network device 102 and ISP 101. The client device 105 via the device capability application 120 may determine user expectation based on the identified unsupported capability.

The client device 105 may send the notification to the service provider device capability server 104 through network device 102 and ISP 101 to inform the service provider about user expectation based on the identified unsupported capability. Network device 102 via device capability app 120 may receive, analyze, and forward to the service provider device capability server 104 notifications received from client device 105. The unsupported capability may include a type of use case associated with the activity of the client device 105, interaction data associated with the client device 105, identification of the client device 105, and an identification of event unsupported by the client device 105. The identified unsupported capability may include an enhanced communication protocol, a new security protocol, a new video format, codec, or resolution, an extension to a browser capability, a new proximity service, a new storage file system format, and a new architecture or accessibility tag.

The client device 105 via the device capability application 120 identifies factors associated with the identified unsupported capability determines at least one trend based on the identified factors, and sends the service provider information regarding the at least one trend. The client device 105 via the device capability application 120 identifies an upgrade based on the identified unsupported capability, sends a message to the service provider device capability server 104 regarding the identified upgrade, and receives a response message from the service provider device capability server 104, wherein the response message includes information regarding determined user expectation based on the identified unsupported capability and information regarding the upgrade. The response message may include an audio message presented by a speaker of client device, an audio message presented to a Bluetooth proximity audio devices, an audio and video message presented on a connected media device, and a short message service (SMS) message to a registered mobile device associated with the client device. The client device 105 presents the response message via a user interface. Market differentiators associated with the client device 105, customer attractions, product brand value factors, and factors to improve customer service and cost savings may be identified by the client device 105.

FIG. 2 illustrates a network device 200.

In FIG. 2, the network device 200 may be a gateway or a client device. Network device 200 includes a processor 210, memory 220, a media access controller (MAC) and physical transceiver (PHY) 230, mobile wireless communications system 232, and applications subsystem 240. Media access controller (MAC) and physical transceiver (PHY) 230 provides communication with an IP network, such as a Wi-Fi network. Mobile wireless communication subsystem 232 provides communication with a mobile data network 236. Network device 200 may also include a display/touch screen 280 and a user interface 282. Not all network devices 200 include display/touch screen 280.

Memory 220 includes an application for detection, analyzing, and forwarding information associated with unsupported capabilities for network device 200. Application subsystem 240 includes applications 250, transport connection services 252 and a device configuration file 254. Applications 250 may include network management 260 and device capabilities analyzer 262. Device configuration file 254 may include, among other information, a service set identifier, a MAC address, etc.

Processor 210 may be configured to execute instructions stored on said memory 220 to cause said network device 200 to provide, for example, wireless/wired network communication 234 (such as Wi-Fi, Bluetooth, Ethernet, etc.) via Media access controller (MAC) and physical transceiver (PHY) 230 and communications via mobile data network 236 using wireless communication subsystem 232. Processor 210 may execute the processes carried out by the network management 260, device capabilities analyzer 262, and transport connection services 252. Processor 210 may further implement the device configuration file 254 and cause unsupported capabilities 222 to be stored by memory 220. Communication between the components (e.g., 210, 220, 230, 232, 240, 280, 282) of the network device 200 may be established using an internal bus 290.

Certain subject matter of the present disclosure is described herein as including logic or a number of components, units, elements, or mechanisms. The network device 200 may constitute either software elements (e.g., code embodied on a machine-readable medium) or hardware elements. A "hardware element" is a tangible unit capable of performing certain operations and may be configured or arranged in a certain physical manner. In various example, one or more computer systems (e.g., a standalone computer system, a client computer system, or a server computer system) or one or more hardware elements of a computer system (e.g., a processor or a group of processors) may be configured by software (e.g., an application or application portion) as a hardware element that operates to perform certain operations as described herein.

The device capabilities analyzer 262 monitors activity of the network device 200, detects unsupported capabilities 222 from the monitored activity, and identifies the unsupported capabilities 222. The device capabilities analyzer 262 stores information associated with the identified unsupported capability 222 in memory 220. The device capabilities analyzer 262 may then send a notification about the identified unsupported capabilities 222 to a service provider. The device capabilities analyzer 262 may analyze the unsupported capabilities 222 to determine user expectation based on the identified unsupported capabilities 222.

Processor 210 of network device 200 may send a notification about the identified unsupported capability 222 to a service provider using the media access controller (MAC) and physical transceiver (PHY) 230 or the mobile wireless communications system 232. Unsupported capability 222 may include a type of use case associated with the activity of the network device 200, interaction data associated with the network device 200, identification of the network device 200, and an identification of event unsupported by the network device 200. The identified unsupported capability 222 may include an enhanced communication protocol, a new security protocol, a new video format, codec, or resolution, an extension to a browser capability, a new proximity service, a new storage file system format, and a new architecture or accessibility tag.

The network device 200 uses the device capabilities analyzer 262 to identify factors associated with the identified unsupported capabilities 222, determines at least one trend based on the identified factors, and sends the service provider information regarding the at least one trend. The network device 200 uses the device capabilities analyzer 262 to identify an upgrade based on the identified unsupported capabilities 222, sends a message to the service provider regarding the identified upgrade, and receives a response message from the service provider that includes information regarding determined user expectation based on the identified unsupported capabilities 222 and information regarding the upgrade. The response message may be presented via user interface 282, such as by presenting an audio message using a speaker, send an audio message presented to a Bluetooth proximity audio devices, an audio and video message presented on a connected media device, and a short message service (SMS) message to a registered mobile device associated with the client device. Market differentiators associated with the network device 200, customer attractions, product brand value factors, and factors to improve customer service and cost savings may be identified by the network device 200.

FIG. 3 is a diagram of a device capabilities server 300.

In FIG. 3, the device capabilities server 300 includes a processor 310, memory 320, a media access controller (MAC) and physical transceiver (PHY) 330, a mobile wireless communications subsystem 340, and applications subsystem 350. Memory 320 stores unsupported capabilities 322 and capabilities notification messages 324. MAC and PHY transceiver 330 provide communication via wireless network 332 and wired network 334. Mobile wireless communications subsystem 340 provides communication via mobile data network 342, such as a cellular network. Applications subsystem 350 includes applications 360 including network management 362 and device capability service 364. Applications subsystem 350 also includes transport connection services 370 and server controller 380. Transport connection services 370 manage connections and ensures reliable service connections by providing protection and recovery capability. Server controller 380 manages communications and processing of data, such as in support of device capability service 364. Communication between the components (e.g., process 310, memory 320, MAC and PHY 330, mobile wireless communication subsystem 340, and applications subsystem 350) of the device capabilities server 300 may be established using an internal bus 290.

Device capability service 364 receives notification about the identified unsupported capability from a client device. Such notifications are received and processed by device capability service 364 and inform the device capabilities server 300 about user expectation based on the identified unsupported capability. The device capability service 364 stores unsupported capabilities 322 reported by a client device in memory 320. Unsupported capabilities 322 may include a type of use case associated with the activity of a client device, interaction data associated with the client device, identification of the client device, and an identification of event unsupported by the client device. The identified unsupported capabilities may also include an enhanced communication protocol, a new security protocol, a new video format, codec, or resolution, an extension to a browser capability, a new proximity service, a new storage file system format, and a new architecture or accessibility tag.

The device capabilities server 300 receives capabilities notification messages 324 that include information regarding at least one trend. In addition, the capabilities notification messages 324 may include information identifying an upgrade based on the identified unsupported capabilities 322. The capabilities notification messages 324 are stored in memory 320. The device capabilities server 300 may send a response message to a client device that includes information regarding determined user expectation based on the identified unsupported capabilities 322 and information regarding the upgrade. The response message may further include an audio message presented by a speaker of client device, an audio message presented to a Bluetooth audio devices proximate to the client device, an audio and video message presented on a connected media device, and a short message service (SMS) message to a registered mobile device associated with the client device.

FIG. 4 is a diagram illustrating a network device 400 to extract trends.

In FIG. 4, the network device includes processor 410 and device capabilities analyzer 420. Device capabilities analyzer 420 is implemented by processor 410 to process device capabilities data 430 that is determined from identified unsupported capabilities. Device capabilities analyzer 420 uses the device capabilities data 430 to extract trends 450. Device capabilities data 430 includes one or more of an enhanced communication protocol 432, a new security protocol/mode 434, a new video format/codec/resolution 436, extensions to browser capability 438, a new proximity service 440, a new storage file system/format 442, and a new architecture/accessibility tag 444. Extracted trends 450 may include one or more of trend in device capabilities 452, market differentiators 454, customer attractions 456, product brand value factors 458, factors to improve customer service 460, and cost savings 462.

Figure 5:
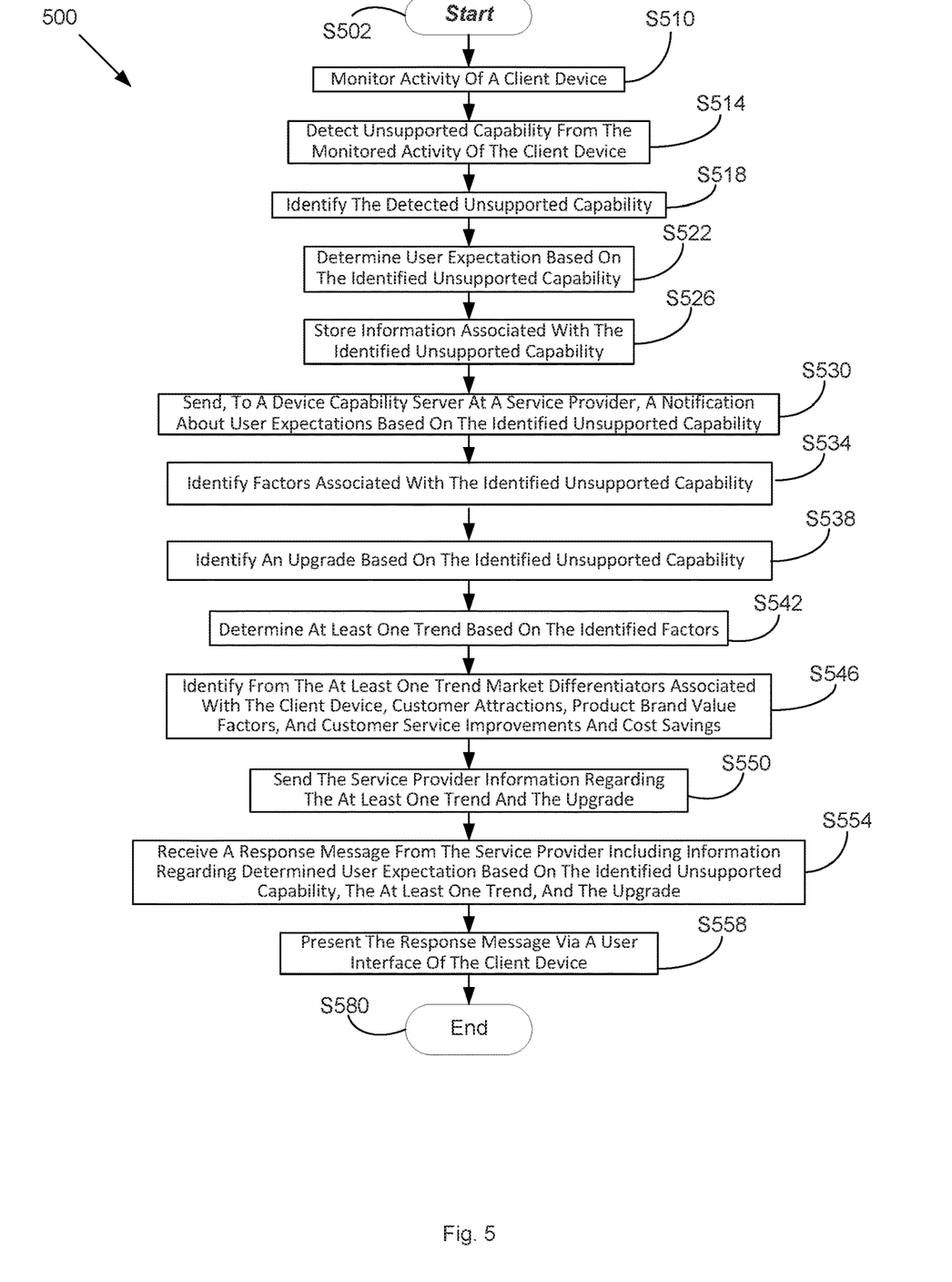
FIG. 5 is a flow chart illustrating monitoring unsupported capability of a client device.

FIG. 5 is a flow chart 500 illustrating monitoring unsupported capability of a client device.

In FIG. 5, it is assumed that a network device, such as client device 105 illustrated in FIG. 1, includes software stored in memory, which when executed perform functions and operations of the subject matter of the present disclosure. In FIG. 5, method 500 starts (S502), and a client device begins to monitor activity of the client device (S510). Referring to FIG. 1, a client device 105 may include a device capability app 120. Thus, client device 105 may monitor activity of the client device 105

The client device detects unsupported capability from the monitored activity of the client device (S514). The client device identifies the detected unsupported capability (S518). User expectation are determined based on the identified unsupported capability (S522). Information associated with the identified unsupported capability is stored (S526). The client device sends, to a device capability server at a service provider, a notification about user expectations based on the identified unsupported capability (S530). In FIG. 1, client device 105 uses device capability application 120 to detect unsupported capability from the monitored activity, identify the unsupported capability, store information associated with the identified unsupported capability, and send a notification about the identified unsupported capability to the service provider device capability server 104 through network device 102 and ISP 101. The client device 105 via the device capability application 120 may determine user expectation based on the identified unsupported capability.

Factors associated with the identified unsupported capability are identified (S534). Referring again to FIG. 1, the client device 105 via the device capability application 120 identifies factors associated with the identified unsupported capability.

An upgrade is identified based on the identified unsupported capability (S538). In FIG. 1, the client device 105 via the device capability application 120 identifies an upgrade based on the identified unsupported capability.

At least one trend is determined based on the identified factors (S542). In FIG. 1, the client device 105 via the device capability application 120 determines at least one trend based on the identified factors.

Customer attractions, product brand value factors, and customer service improvements and cost savings are identified from the at least one trend market differentiators associated with the client device (S546). Referring to FIG. 1, customer attractions, product brand value factors, and factors to improve customer service and cost savings may be identified by the client device 105.

Information regarding the at least one trend and the upgrade are sent to the service provider (S550). Referring to FIG. 1, the client device 105 sends the service provider information regarding the at least one trend and the upgrade.

The client receives a response message from the service provider including information regarding determined user expectation based on the identified unsupported capability, the at least one trend, and the upgrade (S554). Referring again to FIG. 1, the client receives a response message from the service provider device capability server 104, wherein the response message includes information regarding determined user expectation based on the identified unsupported capability and information regarding the upgrade.

The response message is presented via a user interface of the client device (S558). In FIG. 1, the response message may include an audio message presented by a speaker of client device, an audio message presented to a Bluetooth proximity audio devices, an audio and video message presented on a connected media device, and a short message service (SMS) message to a registered mobile device associated with the client device. The client device 105 presents the response message via a user interface. The method then ends (S580).

The processes discussed in this disclosure may be implemented in hardware, software, or a combination thereof. In the context of software, the described operations represent computer-executable instructions stored on one or more non-transitory computer readable recording medium that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Subject matter of the present disclosure may be provided as a computer program product including one or more non-transitory computer readable recording medium having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Use of the phrases "capable of," "capable to," "operable to," or "configured to", refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A wireless device in a network, the wireless device connected to a network device via the network, the wireless device in communication with a service provider via an Internet Service Provider (ISP) connected to the network device, comprising:
   a memory storing computer-readable instructions of a device capability application of the wireless device; and
   a processor configured to execute the computer-readable instructions of the device capability application to:
      monitor activity of the wireless device;
      detect unsupported capability of the wireless device from the monitored activity of the wireless device;
      identify the unsupported capability;
      identify factors associated with the identified unsupported capability;

determine at least one trend based on the identified factors;

identify an upgrade based on the identified unsupported capability;

store information associated with the identified unsupported capability;

send, to the service provider via the ISP through the network device, a notification about the identified unsupported capability, information regarding the at least one trend, and a message regarding the identified upgrade;

receive a response message, wherein the response message includes information regarding determined user expectation based on the identified unsupported capability, information regarding the upgrade at least one of an audio message presented by a speaker of wireless device, an audio message presented to a Bluetooth proximity audio devices, an audio and video message presented on a connected media device, and a short message service (SMS) message to a registered mobile device associated with the wireless device; and present the response message via a user interface.

2. The wireless device of claim 1, wherein the processor further determines user expectation based on the identified unsupported capability.

3. The wireless device of claim 2, wherein the processor sends the notification to the service provider to inform the service provider about user expectation based on the identified unsupported capability.

4. The wireless device of claim 1, wherein the unsupported capability comprises at least one of a type of use case associated with the activity of the wireless device, interaction data associated with the wireless device, a device identification, and an identification of unsupported event.

5. The wireless device of claim 1, wherein the processor identifies from the at least one trend market differentiators associated with the wireless device, customer attractions, product brand value factors, and factors to improve customer service and cost savings.

6. The wireless device of claim 1, wherein identified unsupported capability comprises one selected from an enhanced communication protocol, a new security protocol, a new video format, codec, or resolution, an extension to a browser capability, a new proximity service, a new storage file system format, and a new architecture or accessibility tag.

7. A method for a device capability application of the wireless device monitoring capabilities of a wireless device in a network, the wireless device connected to a network device via the network, the wireless device in communication with a service provider via an Internet Service Provider (ISP) connected to the network device, the method comprising:

monitoring activity of the wireless device;

detecting unsupported capability of the wireless device from the monitored activity of the wireless device;

identifying the unsupported capability;

identifying factors associated with the identified unsupported capability;

determining at least one trend based on the identified factors;

identifying an upgrade based on the identified unsupported capability;

sending, to the service provider via the ISP through the network device, a notification about the identified unsupported capability, information regarding the at least one trend, and a message regarding the identified upgrade;

receive a response message. wherein the response message includes information regarding determined user expectation based on the identified unsupported capability, information regarding the upgrade at least one of an audio message presented by a speaker of wireless device, an audio message presented to a Bluetooth proximity audio devices, an audio and video message presented on a connected media device, and a short message service (SMS) message to a registered mobile device associated with the wireless device; and present the response message via a user interface.

8. The method of claim 7 further comprises determining user expectation based on the identified unsupported capability, the sending, to the service provider, the notification further comprises sending the service provider a message informing the service provider about user expectations based on the identified unsupported capability.

9. The method of claim 7 further comprising:

based on the at least one trend, identifying market differentiators associated with the wireless device, customer attractions, product brand value factors, and factors to improve customer service and cost savings; and determining user expectations based on the identified unsupported capability.

10. The method of claim 7 further comprising, based on the identified unsupported capability, identifying at least one of an enhanced communication protocol, a new security protocol, a new video format, codec, or resolution, an extension to a browser capability, a new proximity service, a new storage file system format, and a new architecture or accessibility tag.

11. A non-transitory computer-readable media of a wireless device in a network, the wireless device connected to a network device via the network, the wireless device in communication with a service provider via an Internet Service Provider (ISP) connected to the network device, the non-transitory computer-readable media having computer-readable instructions of a device capability application of the wireless device stored thereon, which when executed by a processor causes the processor to perform operations comprising:

monitoring activity of the wireless device;

detecting unsupported capability of the wireless device from the monitored activity of the wireless device;

identifying the unsupported capability;

identifying factors associated with the identified unsupported capability;

determining at least one trend based on the identified factors;

identifying an upgrade based on the identified unsupported capability;

sending, to the service provider via the ISP through the network device, a notification about the identified unsupported capability, information regarding the at least one trend, and a message regarding the identified upgrade;

receiving a response message, wherein the response message includes information regarding determined user expectation based on the identified unsupported capability, information regarding the upgrade at least one of an audio message presented by a speaker of wireless device, an audio message presented to a Bluetooth proximity audio devices, an audio and video message presented on a connected media device, and a short message service (SMS) message to a registered mobile device associated with the wireless device; and presenting the response message via a user interface.

12. The non-transitory computer-readable media of claim 11 further comprises determining user expectation based on the identified unsupported capability, the sending, to the service provider, the notification further comprises sending the service provider a message informing the service provider about user expectations based on the identified unsupported capability.

13. The non-transitory computer-readable media of claim 11 further comprising:
  based on the at least one trend, identifying market differentiators associated with the wireless device, customer attractions, product brand value factors, and factors to improve customer service and cost savings; and
  determining user expectations based on the identified unsupported capability.

14. The non-transitory computer-readable media of claim 11 further comprising, based on the identified unsupported capability, identifying at least one of an enhanced communication protocol, a new security protocol, a new video format, codec, or resolution, an extension to a browser capability, a new proximity service, a new storage file system format, and a new architecture or accessibility tag.

* * * * *